United States Patent [19]

Stuart et al.

[11] Patent Number: 5,768,395
[45] Date of Patent: Jun. 16, 1998

[54] DOUBLE ENDED FIELD COIL ACTUATOR

[75] Inventors: Keith O. Stuart, Cypress; Dennis C. Bulgatz, Reseda, both of Calif.

[73] Assignee: Aura Systems, Inc., El Segundo, Calif.

[21] Appl. No.: 871,313

[22] Filed: Jun. 9, 1997

Related U.S. Application Data

[63] Continuation of Ser. No. 332,648, Nov. 1, 1994, abandoned, which is a continuation of Ser. No. 15,217, Feb. 8, 1993, abandoned, which is a continuation-in-part of Ser. No. 807,123, Dec. 13, 1991, abandoned, which is a continuation-in-part of Ser. No. 908,453, Jul. 10, 1992, Pat. No. 5,307,665, which is a continuation-in-part of Ser. No. 730,634, Jul. 16, 1991, Pat. No. 5,212,977.

[51] Int. Cl.$^6$ ................................................. H04R 25/00
[52] U.S. Cl. ..................................... 381/192; 381/194
[58] Field of Search ........................... 381/115, 117, 381/192, 194, 195, 199, 201; 335/222, 223, 224, 225, 226; 310/13, 14, 15

[56] References Cited

U.S. PATENT DOCUMENTS

| | | | |
|---|---|---|---|
| 1,743,011 | 1/1930 | Zimmerman | 381/194 |
| 1,830,401 | 11/1931 | Miessner | 381/194 |
| 1,976,874 | 10/1934 | Brzeski | 381/194 |
| 4,341,930 | 7/1982 | Steinle et al. | 381/194 |
| 5,212,977 | 5/1993 | Stuart | 72/347 |
| 5,307,665 | 5/1994 | Stuart | 72/347 |

FOREIGN PATENT DOCUMENTS

| 1004321 | 3/1952 | France | 381/194 |
|---|---|---|---|
| 0015398 | 1/1984 | Japan | 381/194 |

*Primary Examiner*—Huyen D. Le
*Attorney, Agent, or Firm*—Kathy Mojibi

[57] ABSTRACT

A field coil actuator includes a magnetic flux conductive material case, an electrical current conductive field coil and two electrical current conductive moving coils uniquely arranged. The case has a first surface and a continuous channel disposed in said first surface. The channel has a pair of opposing walls. The field coil is disposed within the channel between the walls so that a gap remains between the walls above the field coil and another gap remains between the walls below the field coil. When a current is induced in the field coil, magnetic flux is developed across the gaps. The flux is confined substantially normal to the walls of the channel. The electrical current conductive moving coils are each disposed moveably in one of the gaps such that an electrical current in the coil develops a Lorentz force on each of the coils in a direction substantially normal to the current in the moving coil and the magnetic flux to displace the moving coil in response to the current in the moving coil.

7 Claims, 2 Drawing Sheets

DOUBLE ENDED FIELD COIL ACTUATOR

RELATED APPLICATION DATA

This is a continuation of application(s) Ser. No. 08/332,648 filed on Nov. 1, 1994, abandoned, which is a continuation of U.S. Ser. No. 08/015,217 filed on Feb. 8, 1993, abandoned, which is a continuation-in-part of U.S. Ser. No. 07/807,123 filed on Dec. 13, 1991, abandoned, which is continuation-in-part Ser. No. 908,453, filed Jul. 10, 1992, and U.S. Pat. No. 5,307,665 issued on May 5, 1994, which is a continuation-in-part of Ser. No. 730,634, filed Jul. 16, 1991, now U.S. Pat. No. 5,212,977, issued on May 25, 1993.

The present application is also related to commonly owned copending application Ser. No. 07/740,068, filed Aug. 5, 1991 for Voice Coil Actuator (hereinafter "the '068 application"), which is incorporated herein by reference.

FIELD OF THE INVENTION

The present invention relates generally to electromagnet actuators and more particularly to a novel double ended field coil actuator of voice coil design.

BACKGROUND OF THE INVENTION

In a typical voice coil actuator, an electrical current conductive coil is suspended at a zero current bias position within a magnetic field formed in a gap. It is highly desirous that the flux path of the field within this gap be optimally radial with respect to the axis of the coil so that when an externally applied current conducts through the coil, a Lorentz force will be developed which displaces the coil axially from its zero current bias position. As is known, the Lorentz force is linearly proportional to the coil current. However, as will be seen from the following discussion, the flux path is, in the known prior art voice coil actuator, not at an ideal radial orientation with respect to the coil.

In the known prior art voice coil actuator, the magnetic field in the gap is derived from a permanent magnet core. Referring to prior art FIG. 1, there is shown a long coil actuator 10 which is one particular type of prior art voice coil actuator. The construction of its core 12 is based on an axially polarized cylindrical magnet 14 which has a first end face 16 at a first magnetic polarity and a second end face 18 at a second, opposite magnetic polarity. The first end face 16 of the magnet 14 is coaxially mounted on a disk shaped base plate 20 of the core 12. The base plate 20 is formed from magnetic flux conductive material and has a diameter commensurate with the outer diameter of the magnet 14. Mounted on the base plate 20 coaxially within the magnet 14 is a rod 22 of magnetic flux conductive material wherein the rod 22 has a diameter less than the inner diameter of the magnet 14 so that a space therebetween remains. The distal free end 24 of the rod 22 is elevationally commensurate with the second end face 18 of the magnet 14. Completing the core 12 construction, a ring shaped first pole piece 26 and a disk shaped second pole piece 28 are coaxially mounted respectively to the second end face 18 of the magnet 14 and the distal end 24 of the rod 22. Each pole piece 26, 28 is formed from magnet flux conductive material. The first pole piece 26 has an inner diameter less than the inner diameter of the magnet 14 and the second pole piece 28 has a diameter greater than the diameter of the rod 22 with each of these diameters being selected so that a gap remains between the respective facing sides 30, 32 of each pole piece 26, 28.

A coil 34 is mounted to the above core 12 construction and coaxially suspended within the gap. The overall length of the coil 34 and the height of the gap are selected so that as the coil 34 is moved through its total stroke, defined as the maximum positive and negative axial deviation from its zero current bias position, the number of coil turns within the gap, defining the effective length, L, of the coil 34 remains constant. In the long coil actuator 10, an equal length of the coil 34 extends axially from each end of the gap when the coil 34 is in the zero current bias position as best seen in prior art FIG. 1. The positive and negative stroke limit is then equal to the axially projecting length.

In any prior art voice coil actuator, this condition on the constancy of the coil turns within the gap is necessary to maintain the linearity of the relationship between magnetic force, F, on the coil with respect to current, i, within the coil so that F $\mu$i. Since F=iLfB, where B is the magnetic flux density which is assumed to be uniform and radially confined within the gap, it is seen that the force, F, is only dependent on the coil current, i, or F/i=LB, with LB being the constant of proportionality, wherein the cross product drops out since the current is assumed to be perpendicular to the uniform radially confined flux. The above statement that the gap height and the effective coil length, L, are identical for the long coil actuator 10 may only be made if the magnet flux density, B, is assumed to be radially confined and uniformly distributed within the gap.

Another type of known prior art voice coil actuators is known as a short coil actuator. In the short coil actuator, the axial length of the coil is less than the height of the gap and, at zero current bias is centered therein. The positive and negative stroke limit is then equal to one-half of the gap height less the coil length so that the coil is always confined within the gap. Based on the above assumption, the effective length, L, of the coil is then equal to its actual length.

Considering only the geometry of the construction of the long and short coil actuator designs, it would appear that the above condition for linearity exist as long as the magnetic flux density within the gap is assumed to be radially confined and uniformly distributed therein. However, it will be shown that in the prior art voice coil actuators, this assumption is not true. It will therefore become apparent that for either the long coil or short coil actuator, the force, F, is a function of each of the current, i, length, L, and flux density, B, or F=ƒ(i,L,B) wherein ∂F/∂L and ∂F/∂B are nonzero quantities as the coil moves axially due to magnetic flux leakage at the edges of the gap and nonuniformity of flux density along the length of the gap, as set forth in greater detail hereinbelow. This nonzero dependency of the force, F, on each of the effective coil length, L, and flux density, B, causes a non-linear response to the coil current, i, and results in harmonic distortion of the coil actuation. This harmonic distortion is one disadvantage and limitation of the prior art voice coil actuator is that the sound produced by the actuation of the voice coil driving a speaker cone is not a pure analog of the coil current. Another disadvantage and limitation is a reduction of efficiency due to leaking magnetic fields not contributing to the flux passing through the coil.

The assumption on the radial confinement and uniform distribution of the flux density within the gap is false for two reasons which although demonstrated in reference to the long coil actuator 10 are also applicable to the short coil actuator. First, since the respective lower 36, 38 and upper 40, 42 edges of the first and second pole pieces 26, 28 present a discontinuity, the flux density fringes outside of the gap from the edges 36, 38, 40, 42 of the pole pieces 26, 28 such that the flux is not radially confined within the gap. Secondly, since magnetic flux follows the path of least resistance, the flux density in the gap is therefore greatest at the lower edge 36 of the first pole piece 26 where the first pole piece 26 is adjacent the magnet 14 and decreases toward the upper edge 42 of the second pole piece 28 such that the flux is not uniformly distributed. The nonuniformity of distribution also occurs at the fringing fields at either end of the gap.

In either the long or short coil actuator, the nonuniformity of the flux distribution results in the flux which interacts with the coil to be dependent on the instantaneous position, x, of the coil in the gap as determined at the center of the coil. Since the coil has a finite length within the gap, the current through each loop will be effected by a different value of flux density. The total force, F, acting on the coil will therefore be a summation over the length of the coil of the force developed by the current in each loop of the coil interacting with the flux resulting in the expression $F=\int i(x)fB(x)dx$, where the lower and upper limits of integration are $x-L/2$ and $x+L/2$, respectively. Since the coil is continuous over its length, the current in each loop is identical, or $i(x)=i$ so that the above expression simplifies to $F=i\int B(x)dx$. Therefore, $\partial F=(\int B(x)dx)\partial i+(i\int B(x)dx)\partial B$.

Therefore, it is seen that the change of force, $\partial F$, is not linear with respect to the change of current, $\partial i$, but depends on the coil position, x, within the gap, the length of the coil, L, since these terms are within the limits of integration, and the variation of the flux density, B, over the length of the coil. This nonuniformity is especially prevalent in the short coil actuator since the gap height being much greater than the coil length causes the coil to be exposed to a greater degree of nonuniformity of the flux density along the length of the gap. An additional nonlinearity is introduced in the long coil actuator since the coil at either stroke extreme is removed from a fringing field external of the gap, thereby making the effective coil length, L, also a function of the coil position, x, or $L=L(x)$, which therefore introduces a nonlinear variable into the limits of integration.

In addition to the above described nonlinearities of the known voice coil actuator, a further limitation and disadvantage is the magnetic flux leakage external of the core. For example with reference to prior art FIG. 1, the flux will also fringe from each pole end face 16,18 of the magnet 14 external from the core 12. First, this external fringe results in a waste of useable flux, thereby reducing conversion efficiency of the prior art voice coil actuator. Secondly, this external fringe can also detrimentally interact with nearby electronic circuitry, which often requires the prior art voice coil actuator to be heavily shielded which adds to its size, weight and cost.

In the '068 application, referenced above, a novel voice coil actuator which substantially eliminates the dependency of actuation force on the present coil position and further substantially eliminates flux leakage from the core, thereby maximizing efficiency of the actuator, is disclosed. A brief summary of the disclosure of the '068 application is set forth immediately hereinbelow to enable the more casual reader of the present disclosure to appreciate the concepts disclosed in the '068 application without requiring a comprehensive study thereof.

According to the '068 application, one particular embodiment of the voice coil actuator disclosed therein includes a generally cylindrical magnetic flux conductive material core, a cylindrical, radially polarized permanent magnet and an electrical current conductive coil uniquely arranged. The core has a first surface and a continuous arcuate channel coaxially disposed in its first surface. The channel has a pair of opposing walls. The magnet is coaxially disposed in intimate contact with a first one of the walls and spaced from a second one of the walls so that a gap remains between the magnet and the second one of the walls. The magnet, being radially polarized, has a first face of a first magnetic polarity facing the first one of the walls and a second face of a second, opposite magnetic polarity facing the gap. The magnet is further spaced from a bottom of the channel, by a distance at least greater than the width of the gap, so that the magnetic flux is confined substantially radially within the gap. The electrical current conductive coil is disposed moveably in the gap such that an electrical current in the coil develops the Lorentz force on the coil in a direction substantially normal to the magnetic flux to displace said coil in response to such current.

For reasons as fully described in the '068 application, by placing one pole of the magnet adjacent the gap, the magnetic flux will be uniformly distributed substantially along the height of the gap. This construction also ensures that leakage flux is minimized. Since the flux will follow the path of least resistance, it will prefer to be confined through the core and gap. The minimizing of leakage obviates the need for bulky shielding, simplifying packaging, and allows the novel actuator to be smaller and lighter than existing actuators for the same power output, resulting in further benefits.

A disadvantage and limitation of permanent magnet actuators of any type is that at high temperatures, such magnets will experience a loss of polarization. This in turn reduces the flux density through the gap, thereby reducing efficiency of the actuator.

SUMMARY OF THE INVENTION

It is therefore an object of the present invention to provide a novel double-ended field coil actuator wherein such field coil replaces a permanent magnet for flux generation. It is a further object of the present invention to provide a novel double-ended field coil actuator which may be subjected to higher temperatures than comparable permanent magnet actuators. It is another object of the present invention to provide a novel double-ended field coil actuator which minimizes flux leakage from the core thereby maximizing efficiency.

According to one embodiment of the present invention, a novel double-ended field coil actuator includes a magnetic flux conductive material case, an electrical current conductive field coil and two electrical current conductive moving coils uniquely arranged. The case has a first surface and a continuous channel disposed in this first surface. The channel has a pair of opposing walls. The field coil is disposed in the channel between the walls so that a gap remains between the walls above the field coil, and another gap remains between the walls below the field coil. When a DC current is induced in the field coil, a constant magnetic flux is developed across the gaps. The flux within the gaps is further confined substantially normal to the walls of the channel. Each of the moving coils are disposed in one of the gaps such that an electrical current in the moving coil develops a Lorentz force on the coil in a direction substantially normal to the magnetic flux and the moving coil current to displace the moving coil in response to the moving coil current.

The feature of the present invention of using a field coil to develop the magnetic flux across the gaps of an electromagnetic actuator advantageously enables the actuator to be subjected to a wider range of temperatures than can permanent magnet type actuators, for reasons as set forth above. Furthermore, the field coil actuator may also have significant advantages in cost over the permanent magnet type actuator. For example, typical permanent magnets suitable for actuators are fabricated from NdFeB. For a given magnetic field strength, a field coil constructed of copper wire will be of lower cost than the NdFeB magnet.

The construction of the case of the novel field coil actuator disclosed herein also ensures that leakage flux is minimized. Since the field coil is substantially enclosed by the magnetic flux conductive material of the case, the case acts as a shield to minimize such leakage flux. This advantage is obtained because the flux generated by the field coil will follow the path of least resistance. The flux will therefore prefer to be confined through the case and gaps. The minimizing of leakage flux obviates the need for bulky shielding, and simplifies the packaging of the actuator.

These and other objects, advantages and features of the present invention will become readily apparent to those skilled in the art from a study of the following Description of an Exemplary Preferred Embodiment when read in conjunction with the attached Drawing and appended claims.

DESCRIPTION OF AN EXEMPLARY PREFERRED EMBODIMENT

Figure 1:
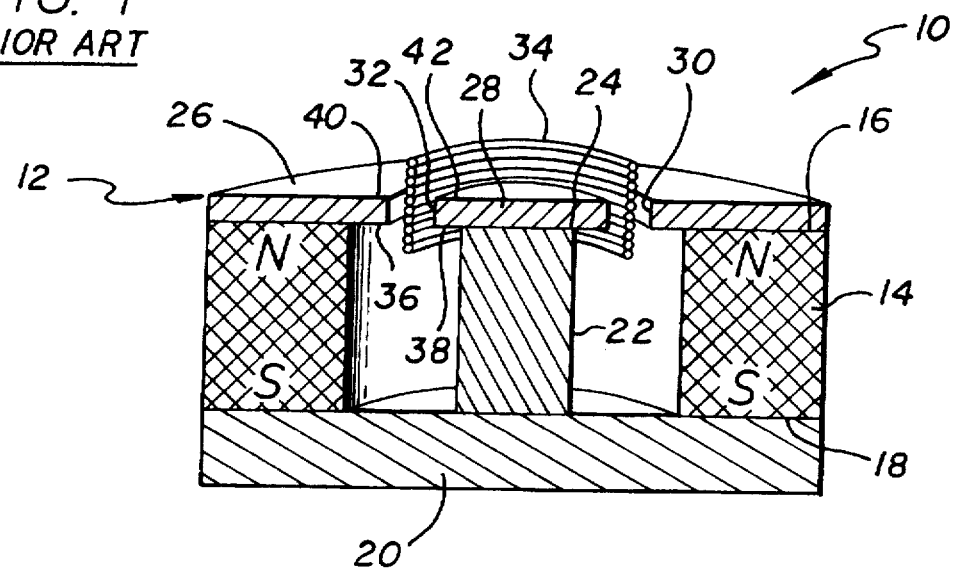
FIG. 1 (PRIOR ART) is a cross sectional view of a known voice coil actuator of long coil design.
Figure 2:
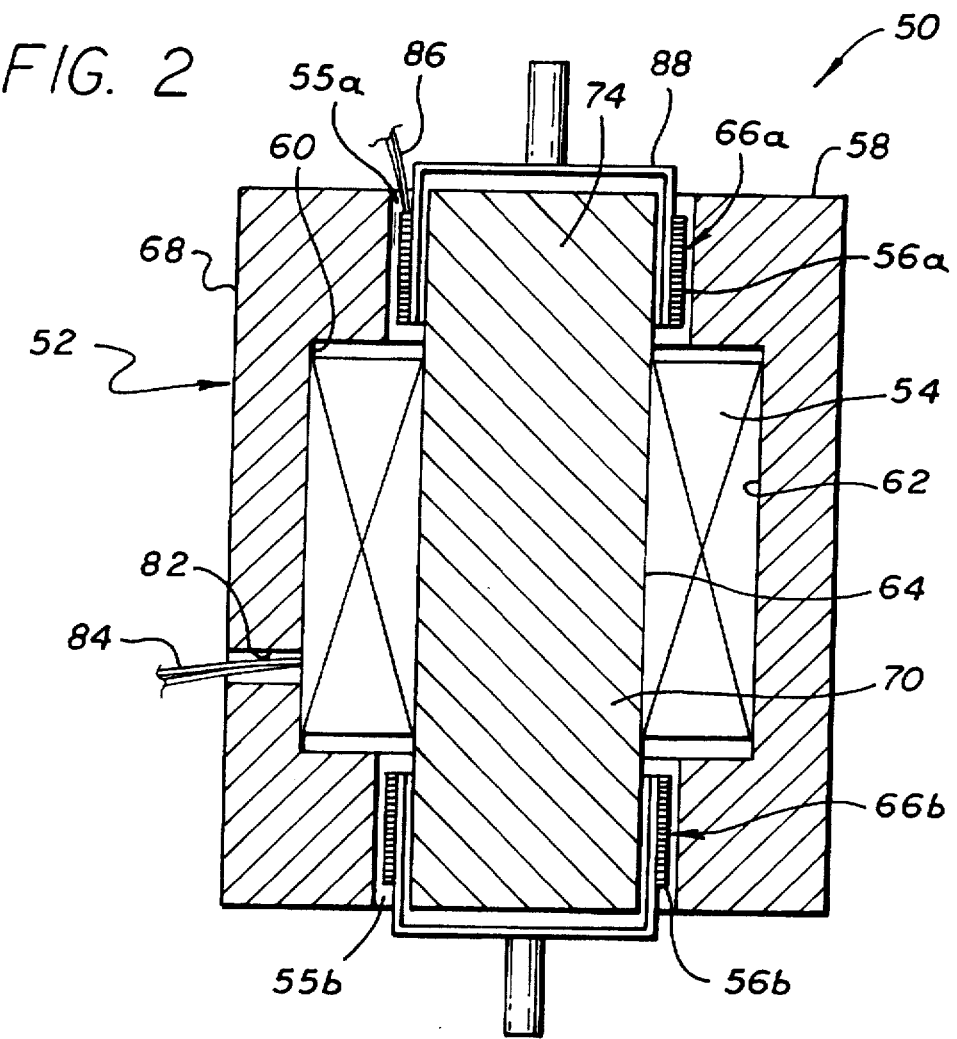
FIG. 2 is a cross sectional view of one embodiment of the double-ended field coil actuator.

Referring now to FIG. 2, there is shown a novel field coil actuator 50 constructed according to the principles of the present invention. The field coil actuator 50 includes a case 52, an electrical current conductive field coil 54 to develop magnetic flux in two gaps 55a, 55b of the case 52, and two electrical current conductive moving coils 56a, 56b.

The case 52 is constructed from magnetic flux conductive material and, as best seen in FIG. 2, has a first surface 58 and a continuous channel 60 disposed in the first surface 58. The channel 60 has an outer first wall 62 and an inner second opposing wall 64. To reduce the width of the gaps 55a, 55b as necessary, the case 52 may further have two flange portions 66a, 66b disposed on either the first wall 62 or the second wall 64 above the field coil 54. As best seen in FIG. 2 for one particular embodiment of the present invention, the flange portions 66a, 66b are disposed along the first wall 62.

There are several alternative possibilities for the construction of the case 52. One particular embodiment of the case 52 is described immediately hereinbelow as only one representative example of construction. The alternative constructions will become readily apparent from the following description.

In the embodiment shown in FIG. 2, the case 52 includes a cylindrical outer first member 68 and an inner second member 70. The above described first wall 62 is formed by the inner cylindrical wall of the first member 68. A cylindrical core 74 is disposed coaxially within the case 52. The core 74 forms the above described second wall 64. The flange portions 66a, 66b, when provided, may be unitarily formed with the first member 68.

The field coil 54 is received by the core 74. The case 52 may include an axial bore 82 through which lead wires 84 may extend to supply current to the field coil 54. When the field coil has a DC current applied thereto, it develops a constant magnetic flux in a path confined through the first member 68, the core 74, the gaps 55a, 55b and, if provided, the flange portions 66a, 66b.

The confinement of the flux, allowing the novel actuator 50 to be self shielding, is due to the fact that the field coil will generate, when in free space, a flux which is generally toroidal about the axis of, and enclosing, the field coil 54. By placing the field coil 54 within the case 52, the path of the flux will be naturally confined to the case 52 since the lower resistance flux path formed by the case 52 is substantially superimposed upon the natural higher resistance free space flux path of the field coil 54.

As a comparison, the permanent magnet 14 in the prior art voice coil actuator 10 described above will develop flux, when in free space, along an inner toroidal path which includes its pole faces 16, 18 and the axis of the magnet 14, and also along an outer toroidal flux path, which includes the pole faces 16, 18 and the space radially external to the magnet 14. The lower resistance flux path of the core 12 of the prior art voice coil actuator 10 is only superimposed upon the inner flux path of the magnet 14 thereby confining only the flux of the inner path and allowing the flux of the outer flux path to fringe external of the core 12.

The moving coil 56 is moveably suspended in the gaps 55a, 55b such that an electrical current, supplied by lead wires 86, in the moving coils 56a, 56b interacts with the magnetic flux in the gap 55. This interaction develops a Lorentz force on the moving coils 56a, 56b in a direction substantially normal to each of the radial magnetic flux and the current in the moving coils 56a, 56b to displace the voice coils 56a, 56b. Of course, when the moving coils 56a, 56b are coaxially suspended in the corresponding gaps 55a, 55b, the Lorentz force will be axial and linearly proportional to the current, as is well known. It is known by various means by which to suspend the voice coils 56a, 56b. For example the moving coil may be wound on a bobbin 88 which in turn transfers the Lorentz force to a load (not shown).

As best seen in FIG. 2, the length of the voice coil 56a, 56b is less than the height of the corresponding gap 55a, 55b. Accordingly, the above described actuator 50 is of short coil design wherein the height of the gap 55 is at least equivalent to the length of the voice coil 56 and its total stroke within the gap 55. The actuator 50 may also be constructed as a long coil actuator (not shown). In either of the short coil actuator 50 or long coil actuator, the travel limits of the stroke of the coil are as set forth above with respect to the prior art actuator 10.

Figure 3:
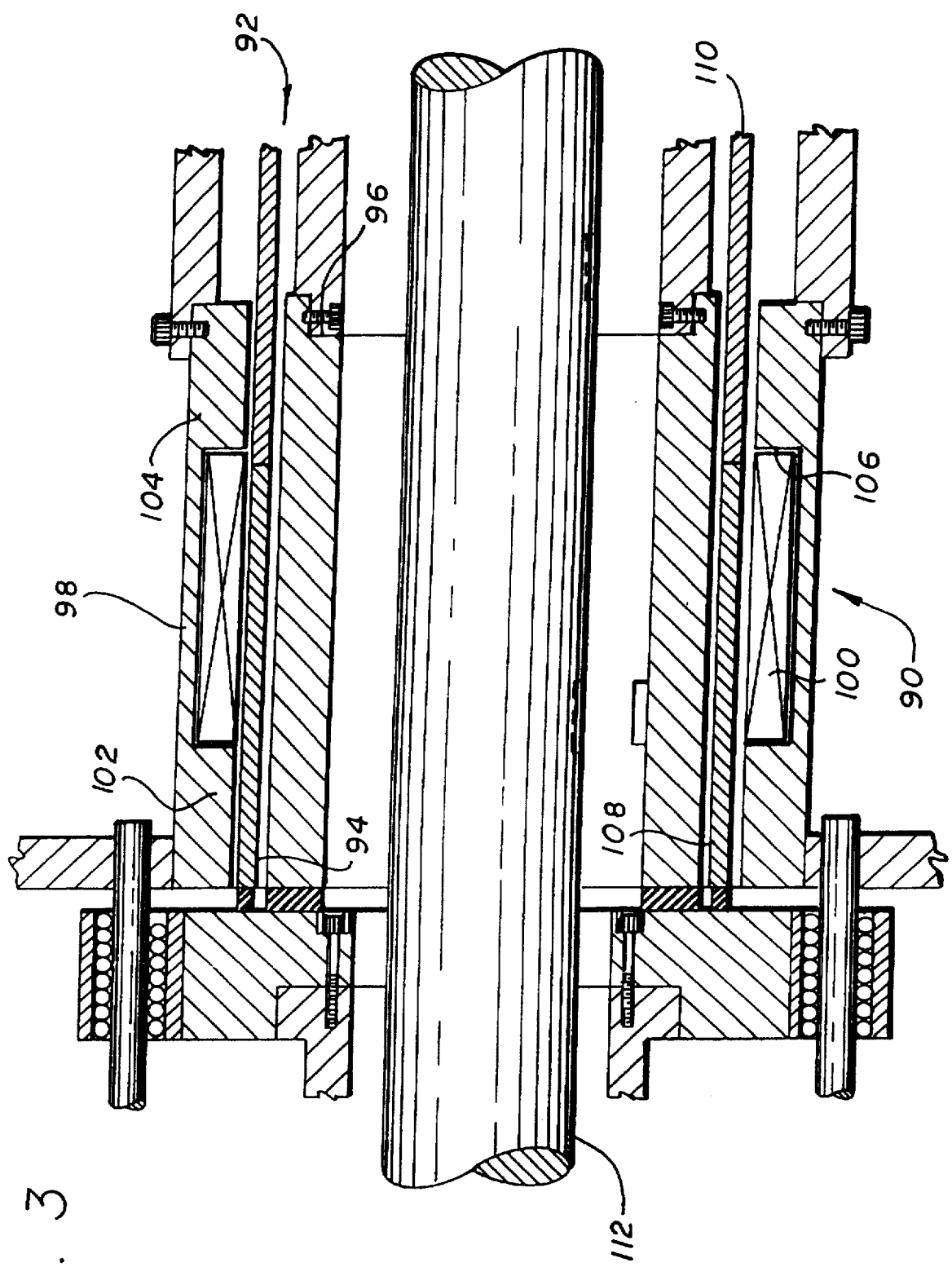
FIG. 3 is a cross sectional view of a second embodiment of the double-ended field coil actuator.

Referring now to FIG. 3, an alternative embodiment 90 of the dual-ended electromagnetic actuator is shown. The actuator 90 includes a core 92 and a coil 94. The coil 94 is moveable along an axis from a first position to a second position. The core 92 includes a cylindrical inner core member 96, a cylindrical outer core member 98, and a field coil 100. The inner core member 96 and the outer core member 98 are constructed from magnetic flux conductive material, such that the field coil 100 develops a closed loop flux path within the actuator 90.

The outer core member 98 has a first end region 102 and a second end region 104 The first end region 102 and the second end region 104 each extend radially inwardly from the outer core member 98. The first end region 102 and the second end region 104 define an annular channel 106 within the outer core member 98.

The field coil 100 is disposed within the annular channel 106. The field coil 100 is wound such that a constant DC current developed therein will develop an axial flux through the inner core member 96, the outer core member 98 and a radially directed flux in a first direction between the inner core member 96 and the first end region 102 and a radially directed flux in the opposite direction between the inner core member 96 and the second end region 104.

The coil 94 has a first coil half 108 proximately disposed to the first end region 102 and its second coil half 110 electrically serially connected to the first coil half 108 and proximately disposed the second end region 104. As described hereinabove, the second coil half 110 is wound counter to the first coil half 108 such that a current throughout the entire length of the coil 94 is of a first polarity in the first coil half 108 and of a second, opposite polarity in the second coil half 110. Therefore, the current through the coil 94 will be of proper polarity in the first coil half 108 and the second coil half 110 when intersecting the radial flux at the respective one of the first end region 102 and the second end region 104. Accordingly, the contributions to force at each of the first coil half 108 and the second coil half 110, as defined by the vector cross product of the current and flux, are additive.

The above described actuator 90, with the reverse polarity coil halves 108, 110 allows for a brushless design with the current taps of the coil 94 being at each end thereof. However, the actuator 90 may also be of the design as disclosed in U.S. Pat. No. 4,912,343, which has been assigned to the assignee of record and which is incorporated herein by reference.

In the embodiment of the actuator 90 shown in FIG. 3, the core 92 and coil 94 are disposed coaxially around a rod 112, which may be connected to an external load (not shown). The rod is mounted, preferably coaxially, to said moveable coil element 94. The actuator 90 causes the rod to move between a fully extended position and a fully retracted position. As described more fully in U.S. Pat. patent application No. 07/908,453, which is incorporated by reference herein, the force, F, required by the actuator 90 to move the rod 112 between its fully retracted position and fully extended position is dependent on the maximum speed of the actuator, or its cycle time, the distance between the fully extended and the fully retracted positions, X, and the mass, m, of the moving assembly connected to the rod 112. The force can thus be computed from the well known relationships of $F=mA$ and $A=2X/T^2$, where T is the time required to move between the fully retracted to the fully extended position.

There has been described hereinabove an exemplary preferred embodiment of a novel field coil actuator. Those skilled in the art may now make numerous uses of and departures from the above described embodiments of the present invention without departing from the inventive concepts disclosed herein. Each of the elements described in connection with the case 52 may be fabricated from individual components and assembled or machined in a different manner from that as described above. Various other alternatives are possible to arrive at the construction shown in FIG. 2. Accordingly, the present invention is to be defined solely by the scope of the following claims.

We claim:

1. A double-ended linear electromagnetic actuator comprising:

an actuator core, said actuator core having a first core member and a second core member, said second core member further having a first end region and a second end region;

a moveable coil element moveable along an axis of movement between a first position and a second position, said moveable coil element being in a coextensive facing relationship with said second core member and having a first coil half proximately disposed the first end region and a second coil half proximately disposed the second end region, wherein the said first coil half is disposed adjacent to said second coil half and further wherein said first coil half is wound in a first direction and the second coil half is wound in a second direction opposite the first direction; and a field coil element, said field coil being intermediate said first core member and said second core member and in a radially spaced apart relationship to said moveable coil, wherein said field coil is disposed intermediate said first end region and said second end region, with said first end region and said second end region each extending inwardly toward said field coil, and further wherein said field coil develops radially directed magnetic flux in a first direction in said first end region between said first core member and said second core member and in a second opposite direction in said second end region between said second core member and said first core member, whereby the flux current cross products of said flux in said first direction and the flux current cross products of said flux in said second direction are additive.

2. A double ended linear electromagnetic actuator in accordance with claim 1 further comprising a rod coaxially mounted to said moveable coil element.

3. An electromagnetic actuator comprising:

a magnetic flux conductive material case having a first case end, a second case end, and an interior wall extending between said first case end and said second case end, and a chamber confined by said interior wall;

an electrical current conductive coil disposed in said chamber coextensively adjacent said wall, said conductive coil having a first coil half, a second coil half and a midpoint, said conductive coil further having a first coil end disposed proximate said first case end, a second coil end disposed proximate said second case end, and further wherein said first coil half is disposed adjacent to said second coil half;

a magnetic flux conductive material core having a first core end, a second core end, and an exterior wall extending between said first core end and said second core end, said exterior wall having a first region and adjacent said first core end and a second region spaced from said first region and adjacent said second core end, said core being moveably received in said chamber with motion of said core occurring between said first case end and said second case end such that said first region traverses said conductive coil between said first coil end and said midpoint and said second region traverses said conductive coil between said second coil end and said midpoint, said conductive coil and said exterior wall being in a coextensive facing relationship with respect to each other; and a field coil disposed in a radially spaced apart relationship to said conductive coil so that magnetic flux across said conductive coil between said first region and said interior wall is in a first direction and magnetic flux across said conductive coil between said second region and said interior wall is in a second direction opposite said first direction, said field coil and said conductive coil being arranged so that a first electrical current in said conductive coil between said first coil end and said midpoint flows in an opposite direction with respect to the direction of a second current in said conductive coil between said second coil end and said midpoint whereby the flux current cross products of said flux in said first direction and the flux current cross products of said flux in said second direction are additive.

4. An electromagnetic actuator is set forth in claim 3 wherein said magnetic flux conductive material case further includes a channel coaxially disposed in said interior wall, said field coil being disposed within said channel.

5. An electromagnetic actuator is set forth in claim 3 wherein said magnetic flux conductive material core further includes an exterior wall channel coaxially disposed in said exterior wall, said field coil being disposed within said exterior wall channel.

6. An electromagnetic actuator as set forth in claim 3 wherein said conductive coil is continuously wound from said first coil end to said second coil end and includes a current input at said midpoint at a commonly connected current return at each of said first coil end and said second coil end.

7. An electromagnetic actuator is set forth in claim 3 wherein said conductive coil is wound in a first direction between said first coil end and said midpoint, and said conductive coil is wound in a second direction opposite said first direction between said midpoint and said second coil end, and includes a current input at said first coil end and a current return at said second coil end.

* * * * *